(12) United States Patent
Loh et al.

(10) Patent No.: US 6,282,086 B1
(45) Date of Patent: Aug. 28, 2001

(54) CARD DEVICE RECEPTACLES

(75) Inventors: Philip Kwok Nan Loh; Tai Woon Woon; Yeow Paul Tan, all of Singapore (SG)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/490,554

(22) Filed: Jan. 25, 2000

(30) Foreign Application Priority Data

Mar. 18, 1999 (SG) .................................................. 9901079-5

(51) Int. Cl.[7] ....................................................... G06F 1/16
(52) U.S. Cl. ........................... 361/684; 361/724; 439/160; 360/98.01
(58) Field of Search ..................................... 361/684, 683, 361/685–686, 724–727; 439/152–160, 928, 928.1; 360/97.03, 98.01

(56) References Cited

U.S. PATENT DOCUMENTS

| | | | |
|---|---|---|---|
| 5,262,926 | * 11/1993 | Hall ....................................... | 361/681 |
| 6,064,566 | * 5/2000 | Agata et al. ........................... | 361/684 |
| 6,102,721 | * 8/2000 | Seto et al. ............................. | 439/160 |
| 6,118,668 | * 9/2000 | Scholder et al. ..................... | 361/735 |

* cited by examiner

*Primary Examiner*—Leo P. Picard
*Assistant Examiner*—Hung Van Duong

(57) ABSTRACT

An arrangement of a first receptacle and a second receptacle for separately receiving a card device in a portable computer. The first and second card receptacles are coupled to allow movement of the receptacles relative to each other between a first configuration where the receptacles are substantially nested, and a second configuration where the receptacles are substantially stacked, such that the receptacles move from the first configuration to the second configuration in order to receive a card device in the first receptacle.

2 Claims, 8 Drawing Sheets

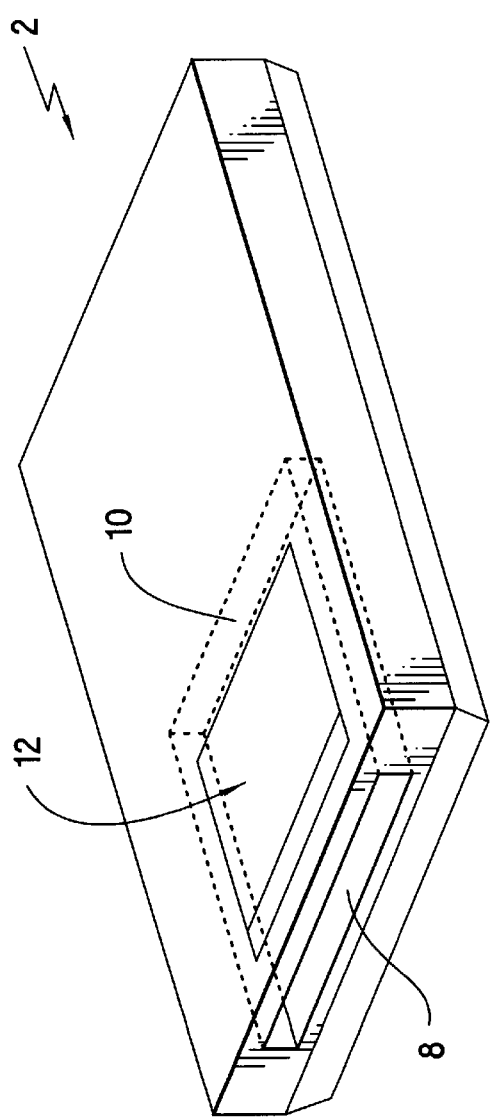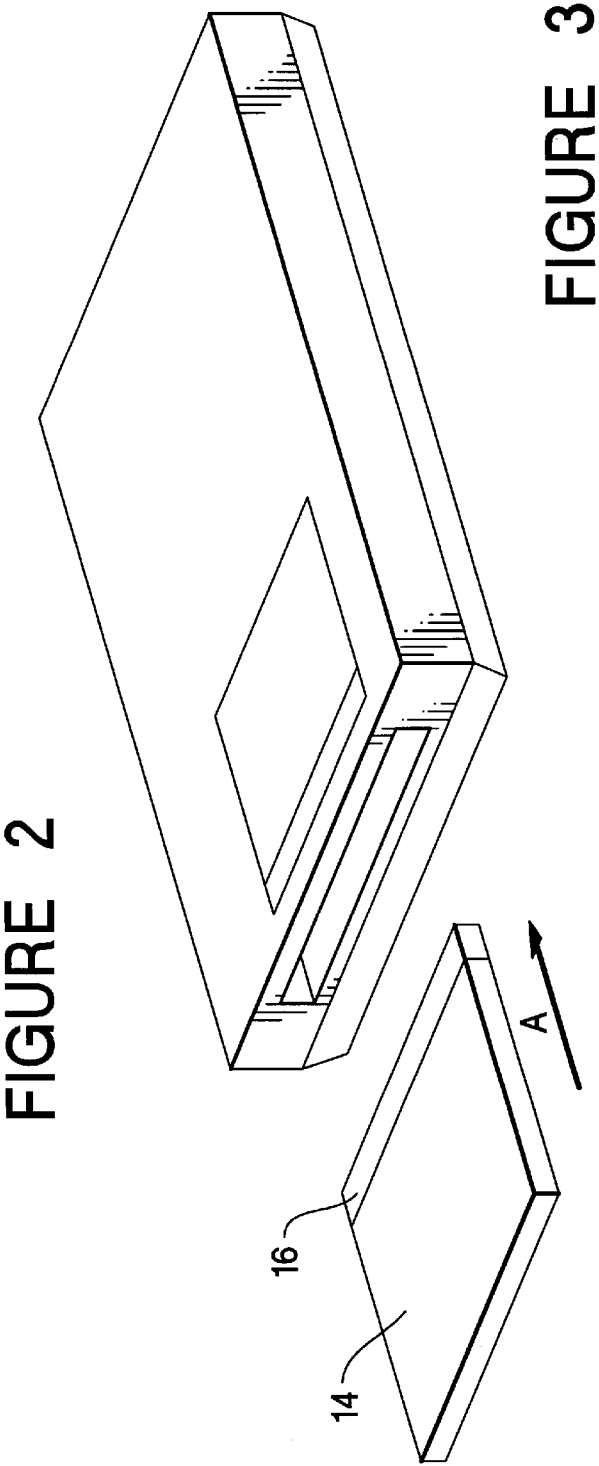

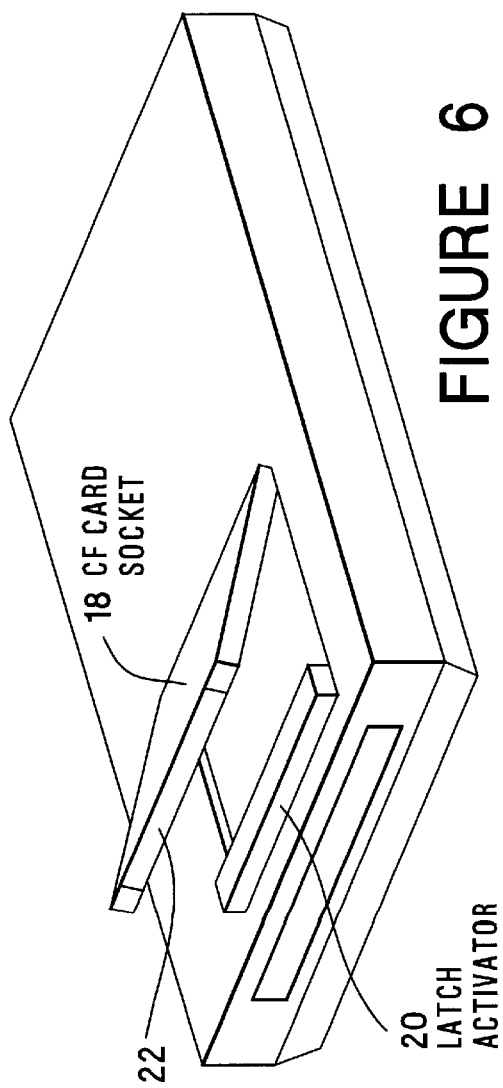
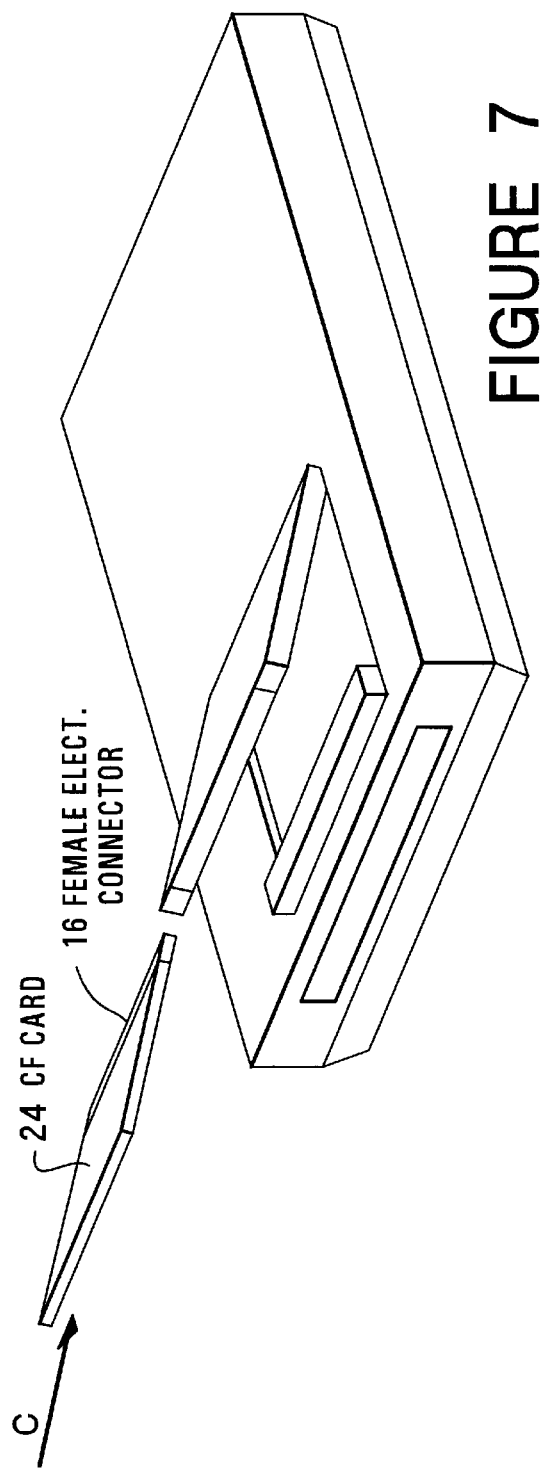
FIGURE 6
FIGURE 7

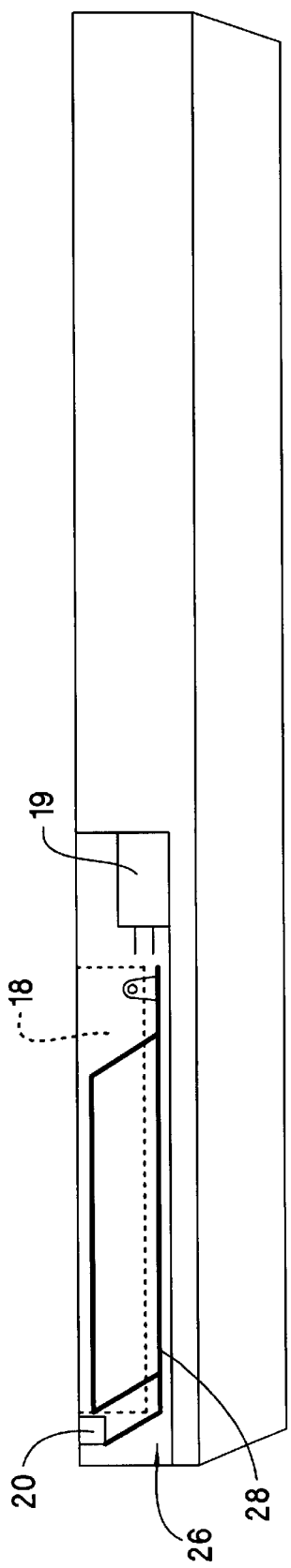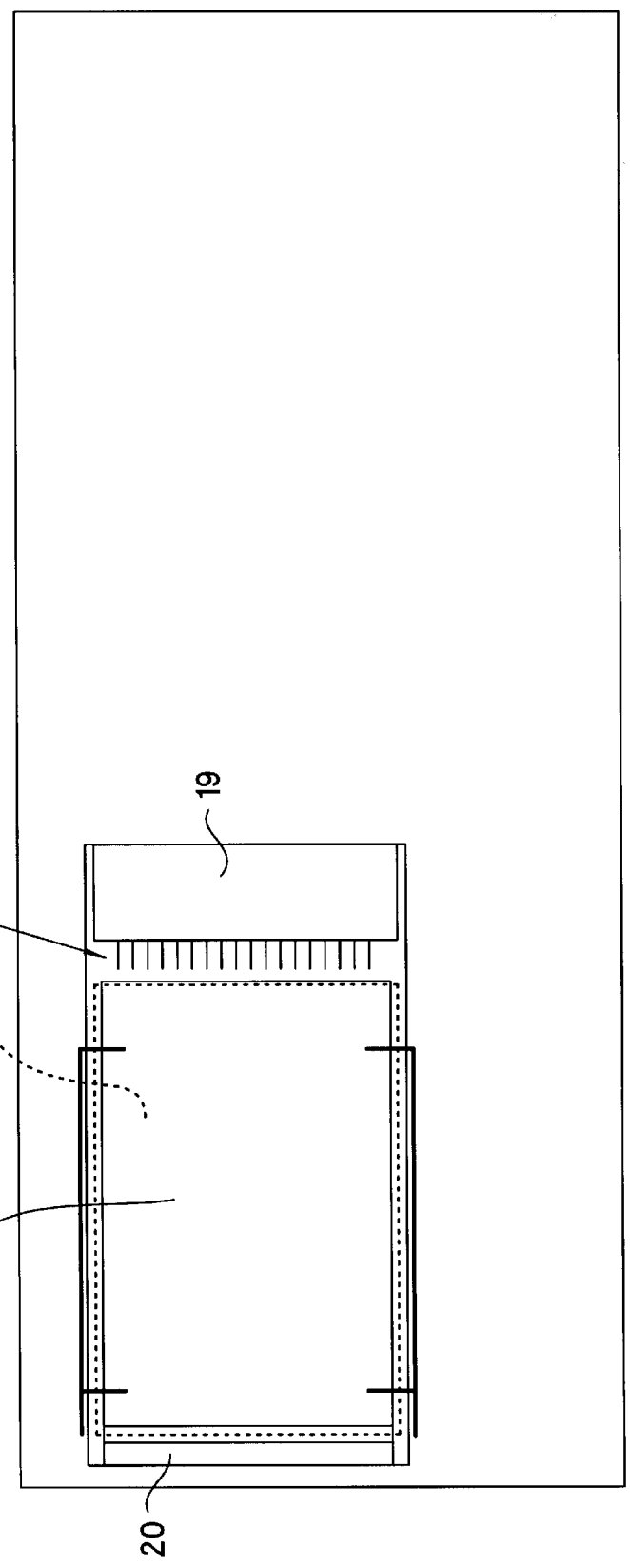

CARD DEVICE RECEPTACLES

FIELD OF INVENTION

This invention relates generally to receptacles for card devices. In particular, the invention relates to an arrangement of two receptacles in a portable computer for receiving one or two card devices.

BACKGROUND OF THE INVENTION

Portable computers are currently available in a variety of forms including, for example, hand-held personal computers (H/PCs) and palm-sized personal computer (P/PC). Such portable computers are gaining popularity among computer users who increasingly use these computers on the move. The benefits provided by such portable computers have often led to users employing these portable computers in many aspects of their personal and business lives.

An important benefit associated with portable computers is the increased mobility afforded to the user. Computer users are now able to do word processing, check e-mails, perform electronic scheduling, update contact databases, and compose electronic spreadsheets, all on the move. A recent growth area in the computer market has thus been in powerful portable computers which provide many of these mobile-related features.

Traditionally, a trade-off between size and power has existed in the field of computer technology. However, the evolution of computer technology has reached a point today such that small computer devices can now offer powerful functions. Nevertheless, despite the miniaturization of cutting-edge portable computers entering the consumer market these days, there will always be a new need for new smaller portable computers to meet a new requirement. Since different computer users may have different needs, today's portable computer must also be expandable. The portable computer industry is therefore adapting a trend towards incorporating commonly used features and functions, i.e. base features and functions, into a basic portable computer, and providing expansion features and functions in an auxiliary fashion.

In order to provide auxiliary features and functions to a portable computer, it is common to package hardware and software into external devices or peripherals. An interface is then provided for connecting these external devices to a portable computer. Popular forms of external device include card devices, such as Compact Flash (CF) cards and Personal Computer (PC) cards. Card receptacles, also known as card slots, are often included in portable computers for receiving and connecting these card devices so that the features or functions provided by the card devices are offered to the user of the portable computer.

A drawback of providing receptacles in portable computers for receiving card devices is the necessary use of space taken up in the portable computer. Sometimes, a portable computer may have two card receptacles so that, for example, one receptacle can receive a storage card and the other card receptacle can receive a modem card. The two card receptacles may be of the same type, such as two PC card slots, or more commonly of different types, such as one PC card slot and one CF card slot.

The HP 620 LX hand-portable computer available from Hewlett-Packard, USA, includes a PC card slot or receptacle on one side of the unit and a CF card slot or receptacle on the other side of the unit. The space occupied by these card receptacles in the HP 620 LX is relatively large compared to the total space occupied by the unit. A user who does not require the expansion options provided by the receptacles is therefore burdened by an unnecessarily large unit.

SUMMARY OF THE INVENTION

According to the present invention there is provided an arrangement in a portable computer of a first receptacle for receiving a card device and a second receptacle for receiving a card device. The first and second card receptacles are coupled to allow displacement of the receptacles relative to each other, between a first configuration in which the receptacles are substantially nested and a second configuration in which the receptacles are substantially stacked, whereby the arrangement of receptacles moves from the first configuration to the second configuration in order to receive a card device in the first receptacle.

Preferably, the first and second card receptacles are also pivotally coupled to allow rotation of the receptacles relative to each other in order to receive a card device in the second receptacle.

Ideally, the second card receptacle is for receiving a relatively small card, such as a CF card, and the first card receptacle is for receiving a relatively larger card, such as a PC card.

According to another aspect, the present invention provides a system of card device receptacles in a portable computer for receiving multiple card devices so as to meet the need for minimizing the tradeoff between extensibility and space in the portable computer. The system may achieve this through the use of multiple sized receptacles for receiving card devices. Preferably, a system having two differently sized receptacles is coupled to form an arrangement of nesting receptacles, with the larger receptacle disposed within the portable computer and absent any card device in the larger receptacle. The smaller receptacle is also capable of being displaced away from the portable computer. When the smaller receptacle is displaced, the larger receptacle is capable of receiving a card device. The displaced smaller receptacle is also coupled so that it remains adjacent to the larger receptacle to form a stack of receptacles.

BRIEF DESCRIPTION OF THE DRAWINGS

The invention will be better understood with reference to the drawings, in which:

FIG. 2 is another perspective view of the H/PC in FIG. 1 that is in a "close" position for illustrating the bottom of the H/PC;

FIG. 3 illustrates the H/PC and a PC card;

FIG. 6 illustrates the H/PC with the displaced CF card socket in FIG. 5 in an "elevated" position;

FIG. 7 illustrates the H/PC with the elevated CF card socket and a CF card;

FIG. 11 is a cross section of the H/PC with the CF card socket removed;

FIG. 12 is a plan view of the H/PC in FIG. 11;

DETAILED DESCRIPTION OF THE PREFERRED EMBODIMENTS

Figure 1:
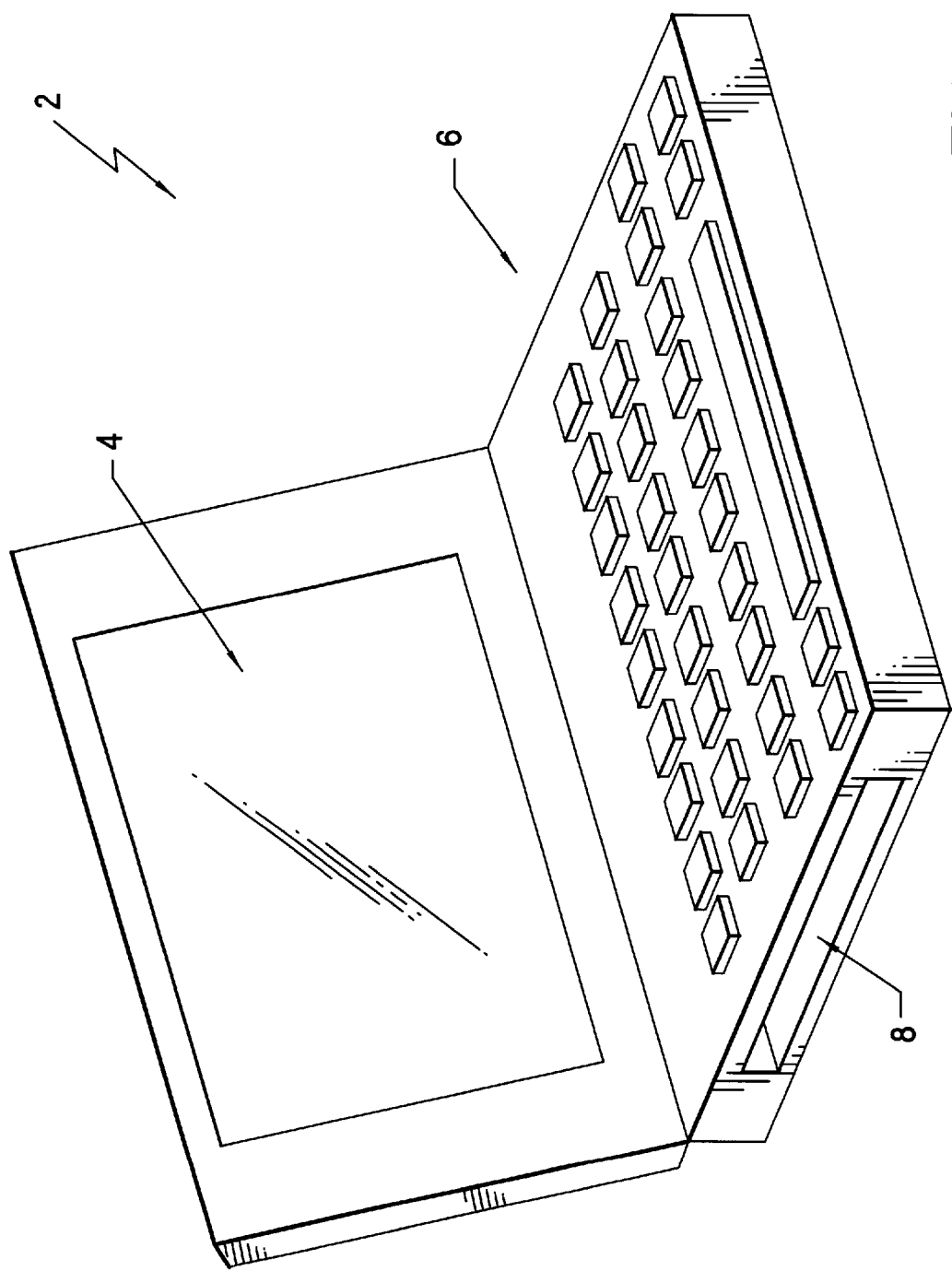
FIG. 1 is a perspective view of a H/PC illustrating its "open" position when it is use by a computer user.

Reference is first made to FIG. 1 to describe a portable computer having a system of card receptacles according to a preferred embodiment of the invention. Preferably, the portable computer is an H/PC 2 that typically is built in a clamshell form having a top portion that includes a display 4 and a bottom portion that includes a key pad 6. In an "open" position shown in FIG. 1 where the top and bottom portions are separated, the H/PC 2 resembles an open clamshell. The display 4 and the key pad 6 integrally perform the input/output function in the H/PC 2 through which a computer user (not shown) interacts with the H/PC 2 by providing data input using the key pad 6 and receiving visual output on the display 4. When not in use by the computer user, the H/PC 2 is usually kept in a "close" position as shown in FIG. 2. FIG. 2 also shows a bottom view of the H/PC 2; the H/PC 2 in this view is rotated through 180° from its view in FIG. 1.

Common to the two views shown separately in FIGS. 1 and 2 is an opening 8 to a card receptacle or slot in the H/PC 2 for receiving card devices. As described in the background, the card devices are capable of providing the H/PC 2 with auxiliary features and functions, thereby rendering the H/PC 2 expandable. As an example, the card receptacle conforms to the PCMCIA format and therefore the opening 8 leads to a PC card socket 10 (shown in hidden details). Also shown in FIG. 2 is the top surface 12 of a second card receptacle for receiving card devices, where the second card receptacle is smaller in size than the PC card socket 10 and fits inside it in a nesting arrangement (to be described in detail later).

Figure 4:
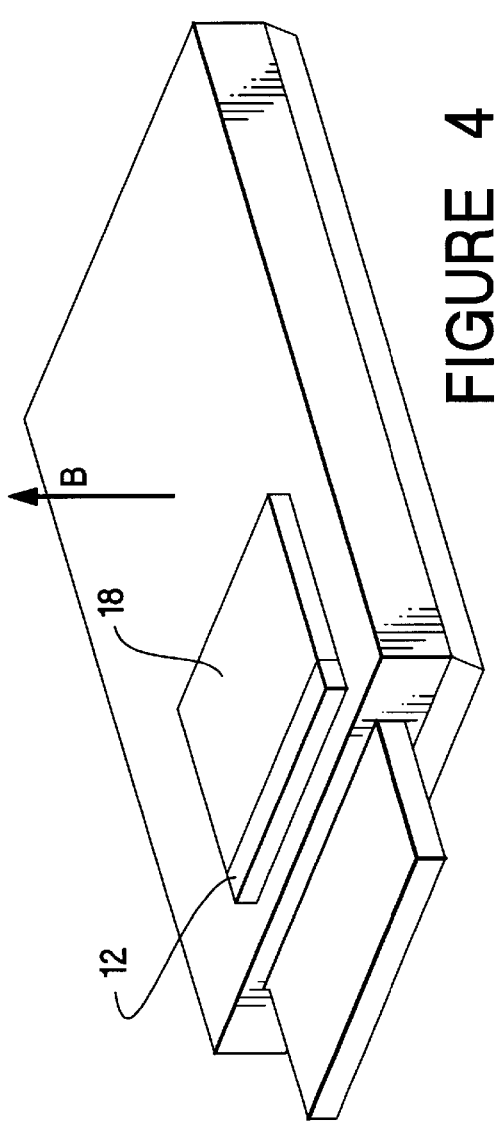
FIG. 4 illustrates the PC card in FIG. 3 being partially inserted into a PC card socket in the H/PC.
Figure 5:
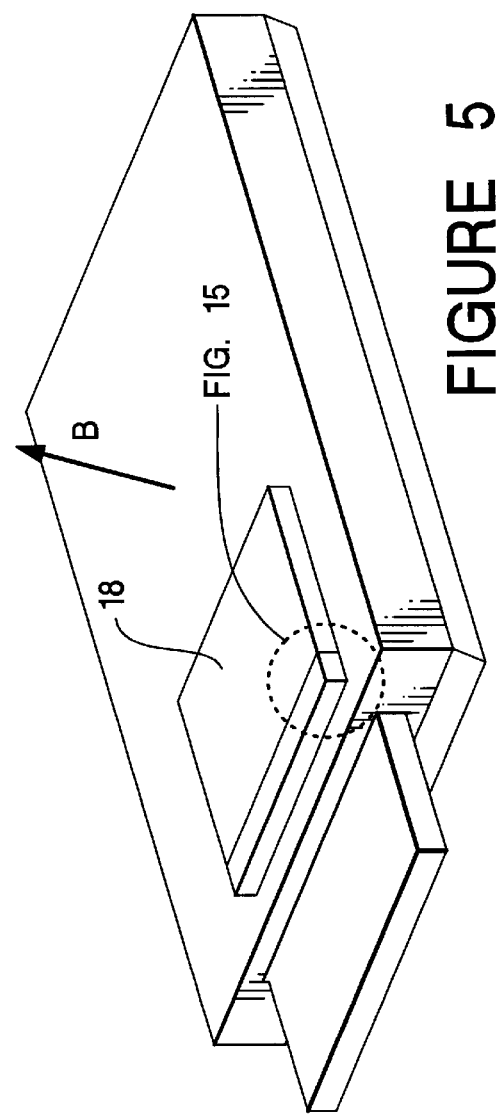
FIG. 5 illustrates the H/PC with the PC card being totally inserted into the PC card socket in the H/PC and the PC card displacing a CF card socket.

FIG. 3 shows a PC card 14 next to the H/PC. In the direction of an arrow A, the computer user may insert the PC card 14, with its female electrical connector 16 leading, through the opening 8 into the PC card socket 10. While being inserted, the PC card 14 slides into the PC card socket 10 and under the second card receptacle, displacing or pushing aside the second card receptacle in the direction of arrow B as shown in FIG. 4. Preferably, the second card receptacle is a CF card socket 18 for receiving CF cards, the CF card socket 18 being smaller in size than the PC card socket 10. When the PC card 14 is fully inserted into the PC card socket 10 as shown in FIG. 5, the female electrical connector 16 mates with the male electrical connector 19 (shown in FIG. 10) in the PC card socket 10 to complete electrical connection (shown in FIG. 13). Arrow B, also shown in FIG. 5, points outwardly or away from the H/PC 2; and the CF card socket 18, being displaced in this direction, thus protrudes from the bottom surface of the H/PC 2. In this arrangement, the PC card socket 10 and the CF card socket 18 now form a stack of card receptacles.

Figure 8:
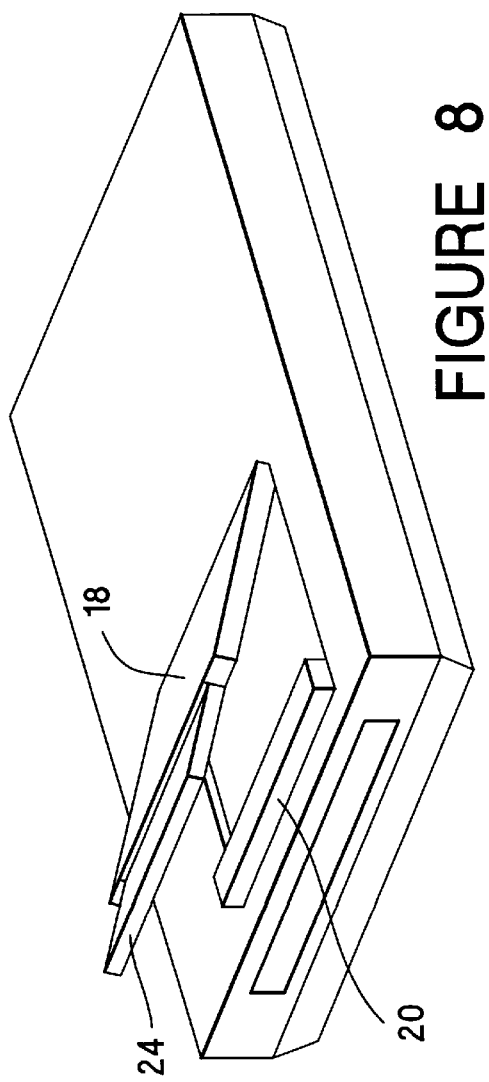
FIG. 8 illustrates the H/PC with the elevated PC card socket and the CF card in FIG. 7 being partially inserted into the CF card socket.
Figure 9:
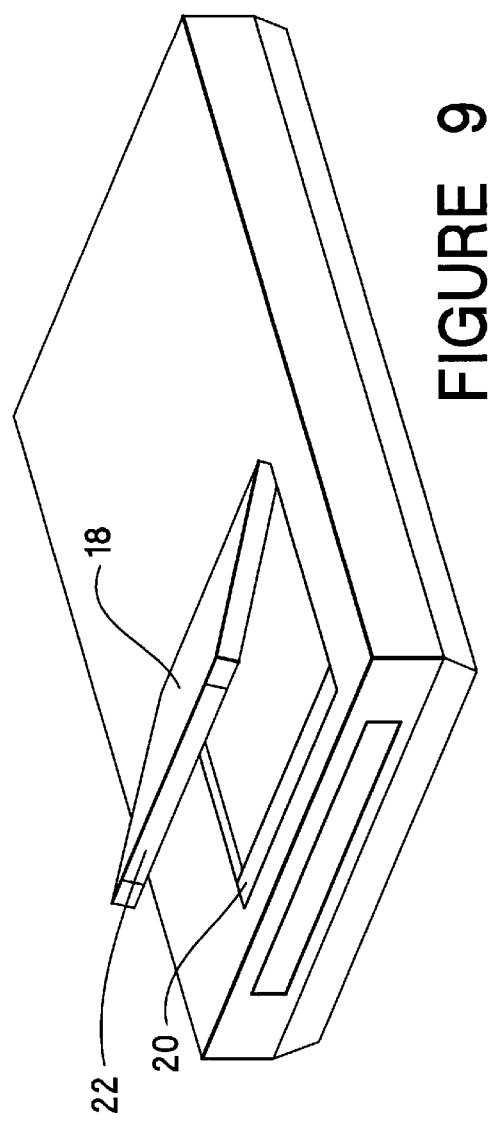
FIG. 9 illustrates the H/PC with the CF card socket in an elevated position absent a PC card in the PC card socket.

A CF card is also another card device capable of providing the H/PC 2 with auxiliary features and functions as described previously. Thus, when the computer user wish to extend the features and functions in the H/PC 2, the computer user may do so by adding an appropriate CF card. The computer user must first disengage a lock, for example through a latch activator 20 (to be described in greater detail later), to allow the CF card socket 18 to pivot about its connecting edge to a position shown in FIG. 6 so that its opening 22 is accessible to the computer user. FIG. 7 shows a CF card 24 next to the H/PC 2 with the CF card socket 18 elevated. In the direction of an arrow C, the computer user may insert the CF card 24, with its female electrical connector 16 leading, through the opening 22 into the CF card socket 18 as shown in FIG. 8. When fully inserted, the female electrical connector 16 connects with a male electrical connector (not shown) in the CF card socket 18 to complete the electrical connection between the CF card 24 and the CF card socket 18.

To alternatively add a CF card to the H/PC 2 while the CF card socket 18 and the PC card socket 10 remain in the nesting arrangement, the computer user may disengage the latch activator 20, thereby elevating the CF card socket 18. The opening 22 is subsequently accessible to the computer user, who in a similar fashion to the description above may insert the CF card 24 thereby electrically connecting it to the H/PC 2.

Figure 10:
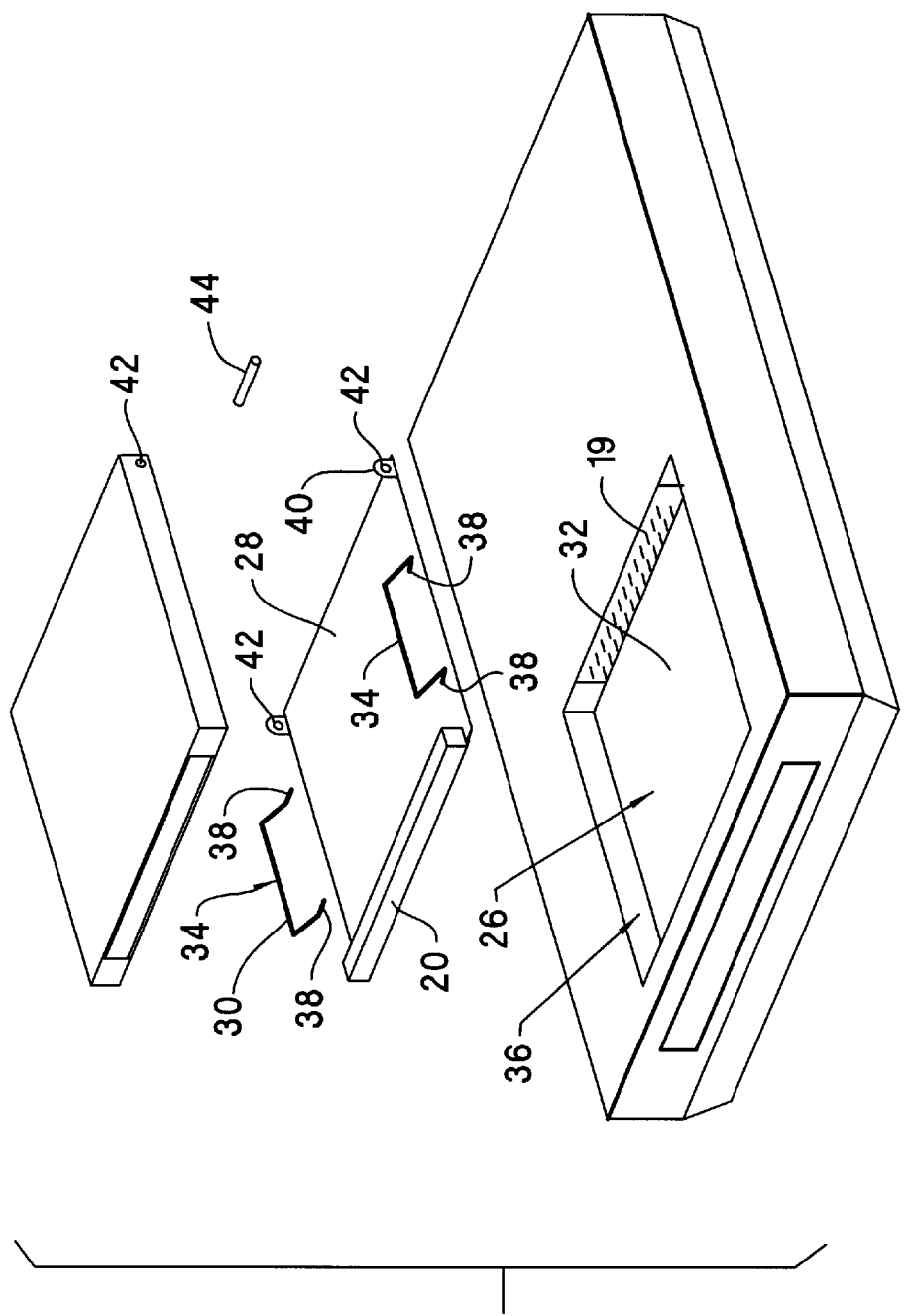
FIG. 10 is a partially exploded view of the H/PC for illustrating the cavity in the PC card socket, a bottom plate and the CF card socket.

A detailed description of the system of card receptacles will now be provided for a better understanding of the invention. FIG. 10 is a partially exploded view of the H/PC 2 in which a cavity 26 in the H/PC 2, a bottom plate 28, a pair of main springs 30 and the CF card socket 18 are shown separately. These elements are necessary for describing the preferred structure of the nesting arrangement formed by the PC card socket 10 and the CF card socket 18. The floor 32 of the cavity 26 will be used as a reference plane for describing the nesting arrangement.

The cavity 26 incorporates the PC card socket 10 and is dimensioned to receive a PC card 14. To allow the PC card socket 10 and the CF card socket 18 to form the nesting arrangement, the cavity 26 is also dimensioned to fit the CF card socket 18. When the PC card socket 10 and the CF card socket 18 form the nesting arrangement, i.e., without the PC card 14 in the H/PC 2, the bottom plate 28 is preferably resiliently biased towards the floor 32. A pair of main springs 30, which are preformed and loaded, are used to resiliently bias the bottom plate 28 towards the floor 32. To provide the resiliency and bias, the straight portions 34 of the main springs 30 are anchored to the sidewalls 36 of the cavity 26 and the angled ends 38 of the main springs 30 are rested on the upper surface of the bottom plate 28. The joints between the straight portion 34 and the angled ends 38 of each main spring 30 then provide the resiliency and bias therein. When the bottom plate 28 is biased towards the floor 32, the space above the bottom plate 28 in the cavity 26 is clear to fit the CF card socket 18. To ensure that the CF card socket 18 is retained inside the cavity 26 and thereby is retaining the nesting arrangement, a latch activator 20 that is connected to the bottom plate 28 and a pair of pivot connectors, for example, may be used. Each pivot connector consists of a flange 40, a pair of apertures 42 where one is found on the flange 40 and the other is found on the CF card socket 18, and a connecting pin 44. The pair of apertures 42 is aligned and the connecting pin 44 is fitted into the aligned pair of apertures 42 to form each pivot connector. Therefore to retain the CF card socket 18 inside the cavity 26, the latch activator 20 is engaged to provide a retention force proximal to the opening 8 of the PC card socket 10 while the pair of pivot connectors provide a retention force distal to the opening 8. FIG. 11 provides a clearer view of the positional relationship between the bottom plate 28 and the cavity 26 in this instance. The CF card socket 18 has been removed from this view for greater clarity, but its hidden details remain to show where it should be positioned within the cavity 26 when it forms the nesting arrangement with the PC card socket 10. FIG. 12 is a plan view of the device in FIG. 11.

Figure 13:
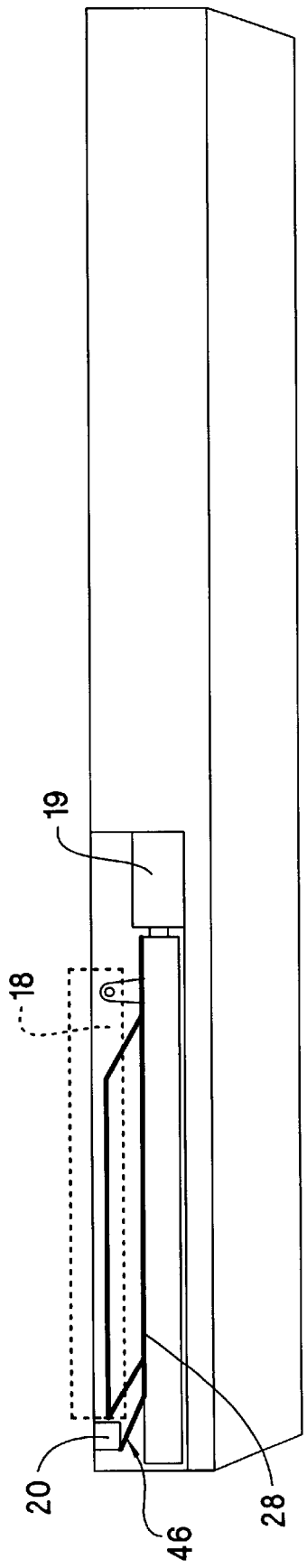
FIG. 13 is a view of the H/PC in FIG. 11 with the PC card inserted into the PC card receptacle.

To describe the preferred structural arrangement in the stack of card receptacles formed by the PC card socket 10 and the CF card socket 18, reference is now made to FIG. 13. Here, the PC card 14 has been added to the nesting arrangement shown in FIG. 11, and as a result the bottom plate 28 is lifted. As described previously, the addition of the PC card 14 is achieved through the insertion of the PC card 14 in the direction of arrow A. As the PC card 14 first enters the cavity through opening 8, its leading edge engages the underside of the bottom plate 28 at a raised portion 46. Since the underside of the raised portion 46 is oblique to the direction of arrow A, the entry force provided by the leading edge of the PC card 14 as it is inserted will be partially resolved in the direction of arrow B. As a result, this resolved entry force will partially lift the bottom plate 28 against the biasing force provided by the pair of main springs 30, away from the floor 32. When the PC card 14 moves further into the cavity 26, the rest of the bottom plate 28 is lifted until eventually the entire bottom plate 28 is leveled as shown in FIG. 13. The pair of main springs 30 at this point become further loaded and would subsequently provide the necessary force and resiliency to lower the bottom plate 28 when the PC card 14 is removed.

Figure 14:
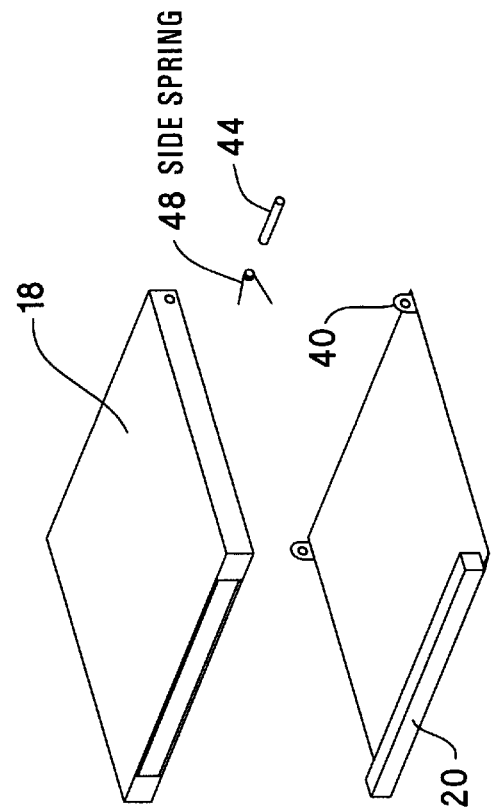
FIG. 14 illustrates in detail the components necessary to connect and elevate the CF card socket with respect to the bottom plate.

For describing the preferred structural relation between the bottom plate 28 and the CF card socket 18 when it is elevated to enable the computer user to insert the CF card 24, reference is made to FIG. 14. In addition to providing the retention force for retaining the CF card socket 18 to the bottom plate 28, the pair of pivot connectors also allows the CF card socket 18 to pivot about the axis formed by the corresponding apertures 42 on the flanges 40 indicated by line D. When the CF card socket 18 pivots away from the bottom plate 28, it is in the elevated position. To maintain the elevated position, the CF card socket 18 is preferably resiliently biased, for example, by a pair of side springs 48. Each side spring 48 is preformed and has a pair of straight portions and a coil linking the pair of straight portions. In operating to resiliently bias the CF card socket 18 in the elevated position, each side spring 48 is connected to each pivot connector whereby each connecting pin 44 is fitted through the coil. The pair of straight portions is then rested on the surfaces of the bottom plate 28 and the CF card socket 18 proximal to that pivot connector. Subsequent to the insertion of the CF card 24, the computer user lowers the CF card socket 18. When lowered, the latch activator 20 is engaged so that CF card socket 18 and the PC card socket 10 remain stacked. At the same time, the pair of side springs 48 is loaded.

Figure 15:
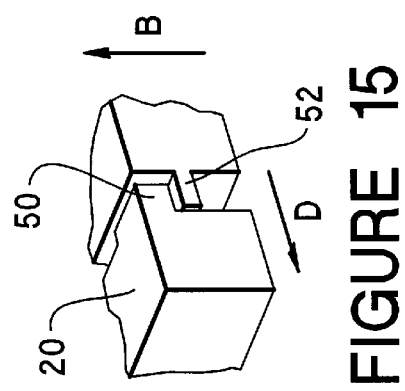
FIG. 15 is an expanded view of a latch in FIG. 5.

The latch activator 20, which is for example attached to the raised portion 46 of the bottom plate 28, is now described in greater detail with reference to FIG. 15. On each end of the latch activator 20 is found a coupling flange 50, and on the opposing edge of the CF card socket 18 is found a reciprocating coupling flange 52. The two coupling flanges 50, 52 reciprocally abut each other at their respective opposing surfaces, where the flange 50 provides a force opposing the direction in arrow B. As a result, the latch activator 20 provides a force to retain the lowered the CF card socket 18 against the biasing force of the pair of side springs 48. The latch activator 20 may be disengaged by urging it away from the reciprocating coupling flanges 52 in order to release the CF card socket 18.

The preferred embodiment can be modified in many ways. For instance, a requirement for having two PC card sockets in the H/PC 2 may arise. To meet this requirement, the cavity 26 may be built to an appropriate size to fit a second PC card socket instead of the CF card socket 18 so that a nesting arrangement of PC card sockets is formed. Although the PC card socket 10 may then be built larger than it is required for receiving the PC card 14, the additional space used in this instance will still be considerably lesser than the space used for building two separate PC card sockets in the H/PC 2. As such the benefit gained in relation to space reduction will still be apparent.

As another example, the two card receptacles may be biased as a stack of card receptacles so that the smaller card receptacle, i.e. the CF card socket 18 or the second PC card socket, protrudes from the bottom of the H/PC 2. For this arrangement to be possible, the two card receptacles have to be biased to remain apart and only are held in the nesting arrangement by a locking mechanism which is releasable with the insertion of the PC card 14.

As a further example, the smaller card receptacle that protrudes from the bottom of the H/PC 2 need s not be limited to be part of a structural arrangement to allow for its elevation so that its opening is accessible. Instead, the latch activator 20, and thereby the lock, may be removed and the smaller card receptacle may be fixedly retained to the bottom plate 28. The effect is that the smaller card receptacle will be restricted to a range of motion and positions relating to either the nesting or stack arrangement. Its opening, with the lock removed, is now also accessible. Furthermore, it is also possible to remove the bottom plate 28 and apply the biasing directly to the smaller card receptacle.

The dimensions of the CF card socket 18 are similar to the size of a PC card. However, the space required to receive a CF card is only about half the size of a PC card. Therefore, in a preferred embodiment, the CF card socket 18 also includes a speaker and a battery compartment located towards the hinge end. In this way, the space available when the PC card is absent is further utilised.

What is claimed is:

1. An arrangement of a first receptacle and a second receptacle for separately receiving a card device in a portable computer, in which the first and second card receptacles are coupled to allow movement of the receptacles relative to each other between a first configuration where the receptacles are substantially nested, and a second configuration where the receptacles are substantially stacked, such that the receptacles move from the first configuration to the second configuration in order to receive a card device in the first receptacle.

2. An assembly of multiple sized receptacles in a portable computer capable of receiving card devices, the system comprising:

a first receptacle for receiving a first card device;

a second substantially larger receptacle disposed within the portable computer for receiving a second card device, wherein the second receptacle is additionally capable of substantially receiving the first receptacle to form an arrangement of nesting receptacles and wherein the first receptacle is displaceable outwardly from the portable computer and adjacent to the second receptacle to form a stack of receptacles; and a coupler movably coupling the two receptacles and biasing one of the two receptacles so that the two receptacles form one of the nesting arrangement and the stack of receptacles.

* * * * *